(12) United States Patent
Shemer

(10) Patent No.: US 9,190,061 B1
(45) Date of Patent: Nov. 17, 2015

(54) VISUAL SPEECH DETECTION USING FACIAL LANDMARKS

(71) Applicant: GOOGLE INC., Mountain View, CA (US)

(72) Inventor: Mikhal Shemer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 307 days.

(21) Appl. No.: 13/839,655

(22) Filed: Mar. 15, 2013

(51) Int. Cl.
G10L 15/25 (2013.01)
G10L 25/78 (2013.01)
G06K 9/78 (2006.01)

(52) U.S. Cl.
CPC ........................ G10L 15/25 (2013.01)

(58) Field of Classification Search
CPC ......... G10L 15/20; G10L 15/24; G10L 15/25; G10L 25/78; G06K 9/78
USPC ................... 704/215, 233, 236; 382/118, 170
See application file for complete search history.

(56) References Cited

U.S. PATENT DOCUMENTS

| | | | | |
|---|---|---|---|---|
| 5,586,215 | A * | 12/1996 | Stork et al. | 704/232 |
| 5,680,481 | A * | 10/1997 | Prasad et al. | 382/190 |
| 5,687,280 | A * | 11/1997 | Matsui | 704/231 |
| 6,301,370 | B1 | 10/2001 | Steffens et al. | |
| 6,480,823 | B1 * | 11/2002 | Zhao et al. | 704/226 |
| 6,633,844 | B1 * | 10/2003 | Verma et al. | 704/251 |
| 7,224,823 | B2 * | 5/2007 | Hayata et al. | 382/118 |
| 7,472,063 | B2 * | 12/2008 | Nefian et al. | 704/256.1 |
| 7,555,149 | B2 * | 6/2009 | Peker et al. | 382/118 |
| 8,194,935 | B2 * | 6/2012 | Taniguchi | 382/118 |
| 8,234,113 | B2 * | 7/2012 | Zhang et al. | 704/246 |
| 8,254,647 | B1 | 8/2012 | Nechyba et al. | |
| 8,306,262 | B2 * | 11/2012 | Li | 382/103 |
| 2003/0018475 | A1 * | 1/2003 | Basu et al. | 704/270 |
| 2004/0175021 | A1 * | 9/2004 | Porter et al. | 382/118 |
| 2005/0129326 | A1 * | 6/2005 | Matama | 382/254 |
| 2006/0204060 | A1 * | 9/2006 | Huang et al. | 382/118 |
| 2007/0031041 | A1 * | 2/2007 | Ko et al. | 382/190 |
| 2007/0122006 | A1 * | 5/2007 | Taniguchi | 382/116 |

(Continued)

FOREIGN PATENT DOCUMENTS

EP 1580684 B1 12/2008

OTHER PUBLICATIONS

"In San Francisco, streetcars, buses spy on you", retrieved from: richardbrenneman.wordpress.com/2012/12/12/in-san-francisco-streetcars-buses-spy-on-you/, Dec. 12, 2012, 3 pages.

(Continued)

Primary Examiner — Martin Lerner
(74) Attorney, Agent, or Firm — Brake Hughes Bellermann LLP

(57) ABSTRACT

A data processing apparatus for detecting a probability of speech based on video data is disclosed. The data processing apparatus may include at least one processor, and a non-transitory computer-readable storage medium including instructions executable by the at least one processor, where execution of the instructions by the at least one processor causes the data processing apparatus to execute a visual speech detector. The visual speech detector may be configured to receive a coordinate-based signal. The coordinate-based signal may represent movement or lack of movement of at least one facial landmark of a person in a video signal. The visual speech detector may be configured to compute a probability of speech of the person based on the coordinate-based signal.

20 Claims, 5 Drawing Sheets

(56) References Cited

U.S. PATENT DOCUMENTS

2009/0198492 A1* 8/2009 Rempel .................. 704/233
2010/0085446 A1 4/2010 Thorn
2012/0230545 A1 9/2012 Zhang et al.

OTHER PUBLICATIONS

"Roadrecorder 7000", Safety Vision, 2012, 2 pages.
Zetter, "Public Buses Across Country Quietly Adding Microphones to Record Passenger Conversations", Wired.com, Dec. 10, 2012, 14 pages.

* cited by examiner

VISUAL SPEECH DETECTION USING FACIAL LANDMARKS

TECHNICAL FIELD

This description relates to visual speech detection.

BACKGROUND

Typically, background noise or babble noise may pose a problem in a video-conferencing scenario when determining whether a person is speaking or not. Further, the existence of background or babble noise may make it difficult to understand the person's spoken words. According to one conventional approach, visual speech recognition may recognize spoken word(s) by using only the video signal that is produced during speech. Typically, visual speech recognition deals with the visual domain of speech and involves image processing, artificial intelligence, object detection, pattern recognition, statistical modeling, etc. In one example, the visual speech recognition may employ face detection for "lip reading" to convert lip and mouth movements into speech or text based on visemes. A viseme is the mouth shapes (or appearances) or sequences of mouth dynamics that are required to generate a phoneme in the visual domain. However, visemes cover only a small subspace of the mouth motions represented in the visual domain, and therefore may be limited to a relatively small subset of words.

SUMMARY

The details of one or more implementations are set forth in the accompanying drawings and the description below. Other features will be apparent from the description and drawings, and from the claims.

In one general aspect, a data processing apparatus for detecting a probability of speech based on video data is disclosed. The data processing apparatus may include at least one processor, and a non-transitory computer-readable storage medium including instructions executable by the at least one processor, where execution of the instructions by the at least one processor causes the data processing apparatus to execute a visual speech detector. The visual speech detector may be configured to receive a coordinate-based signal. The coordinate-based signal may represent movement or lack of movement of at least one facial landmark of a person in a video signal. The visual speech detector may be configured to compute a probability of speech of the person based on the coordinate-based signal.

The data processing apparatus may further include a facial landmark detector configured to receive the video signal including video data captured from an image capturing device, and determine coordinates of the at least one facial landmark based on the video data, and a signal generator configured to generate the coordinate-based signal based on the coordinates of the at least one facial landmark.

The at least one facial landmark may include a mouth region of the person. The coordinate-based signal may include values indicating a ratio of height and width of the mouth region for a plurality of video frames.

The visual speech detector may include a quantizer configured to partition the coordinate-based signal into a plurality of bins, a filtered value calculator configured to calculate a short-term value representing short-term characteristics of the partitioned coordinate-based signal and a long-term value representing long-term characteristics of the partitioned coordinate-based signal, a long-term bin selector configured to select a long-term bin from the plurality of bins that corresponds to the long-term value, a short-term bin selector configured to select a short-term bin from the plurality of bins that corresponds to the short-term value, a bin comparator configured to compare the long-term bin with the short-term bin, and a probability calculator configured to calculate the probability of speech based on the comparison.

The bin comparator configured to compare the long-term bin with the short-term bin may include determining that the short-term bin is greater than the long-term bin, and the probability calculator may calculate the probability of speech as a value indicating that speech has occurred.

The bin comparator configured to compare the long-term bin with the short-term bin may include determining that the short-term bin is less than the long-term bin, and the probability calculator may calculate the probability of speech as a value indicating that speech as not occurred.

The bin comparator configured to compare the long-term bin with the short-term bin may include determining that the short-term bin is equal to the long-term bin, and the probability calculator may calculate the probability of speech as an intermediate value between a first value indicating that speech has occurred and a second value indicating that speech has not occurred.

The probability calculator may be configured to adjust the intermediate value based on at least one signal characteristic of the coordinate-based signal.

The data processing apparatus may further include a histogram builder configured to build a histogram of the coordinate-based signal, and a data validator configured to determine an active range of the person based on the histogram, and determine a validity of the coordinate-based signal based on the active range.

In another general aspect, a method for detecting a probability of speech based on video data is disclosed. The method may include receiving, by at least one processor, a coordinate-based signal. The coordinate-based signal may represent movement or lack of movement of at least one facial landmark of a person in a video signal. The method may further include computing, by the at least one processor, a probability of speech of the person based on the coordinate-based signal.

The at least one facial landmark may include a mouth region. The coordinate-based signal may include values indicating a ratio of height and width of the mouth region for a plurality of video frames.

The method may further include partitioning, by the at least one processor, the coordinate-based signal into a plurality of bins, calculating, by the at least one processor, a short-term value representing short-term characteristics of the partitioned coordinated-based signal and a long-term value representing long-term characteristics of the partitioned coordinate-based signal, selecting, by the at least one processor, a long-term bin from the plurality of bins that corresponds to the long-term value and a short-term bin from the plurality of bins that corresponds to the short-term value, comparing, by the at least one processor, the long-term bin with the short-term bin, and calculating, by the at least one processor, the probability of speech based on the comparison.

In another general aspect, a non-transitory computer-readable medium storing instructions that when executed cause at least one processor to detect a probability of speech based on video data is disclosed. The instructions include instructions to receive a coordinate-based signal representing movement or lack of movement of at least one facial landmark of a person in a video signal, partition the coordinate-based signal into a plurality of bins, calculate a short-term value representing short-term characteristics of the partitioned coordinated-based signal and a long-term value representing long-term characteristics of the partitioned coordinate-based signal, select a long-term bin from the plurality of bins that corresponds to the long-term value and a short-term bin from the plurality of bins that corresponds to the short-term value, compare the long-term bin with the short-term bin, and calculate a probability of speech of the person based on the comparison.

The at least one facial landmark may include a mouth region, and the coordinate-based signal may include values indicating a ratio of height and width of the mouth region for a plurality of video frames.

The instructions to compare the long-term bin with the short-term bin may include determining that the short-term bin is greater than the long-term bin, and the instructions to calculate a probability of speech may include calculating the probability of speech as a value indicating that speech has occurred.

The instructions to compare the long-term bin with the short-term bin may include determining that the short-term bin is less than the long-term bin, and the instructions to calculate a probability of speech may include calculating the probability of speech as a value indicating that speech has not occurred.

The instructions to compare the long-term bin with the short-term bin may include determining that the short-term bin is equal to the long-term bin, and the instructions to calculate a probability of speech may include calculating the probability of speech as an intermediate value between a first value indicating that speech has occurred and a second value indicating that speech has not occurred.

The instructions to calculate a probability of speech may include adjusting the intermediate value based on a simultaneous analysis of multiple signal characteristics of the coordinate-based signal.

DETAILED DESCRIPTION

As described herein, speech may be detected based on video data received from an image capturing device such as a camera. For example, a probability of speech may be computed using only the video data captured by the camera. The probability of speech may provide a value indicating how likely a person in proximity to the camera has spoken. In one example, this output may be used to adapt the microphone gain to the speaker in order to reduce the microphone gain's false adaption to babble and background noise. However, the computed probability of speech may be used in a variety of applications. These and other features are further described below with respect to the figures.

Figure 1:
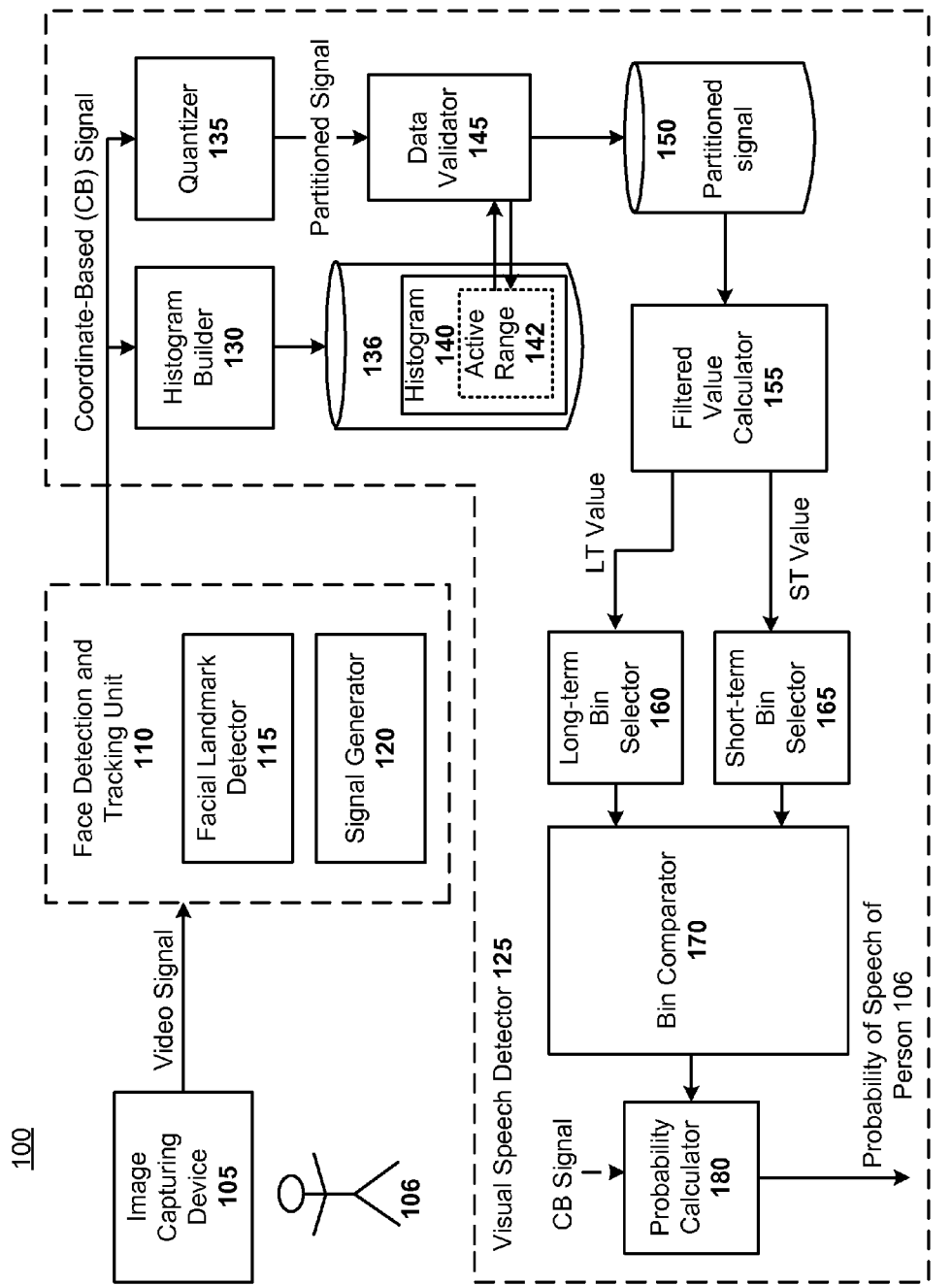
FIG. 1 illustrates a system for computing a probability of speech based on video data.

FIG. 1 illustrates a system 100 for computing a probability of speech based on video data. The system 100 may include an image capturing device 105 configured to capture a video signal including the video data, a face detection and tracking unit 110 configured to detect and track at least one facial landmark (e.g., a mouth region) using the video data and generate a coordinate-based signal representing motion (or lack thereof) of the at least one facial landmark over a period of time, and a visual speech detector 125 configured to compute the probability of speech based on the coordinate-based signal. Also, the system 100 may include other components that are well known to one of ordinary skill in the art such as appropriate buffers, decoders, and video data processors, etc., and may vary depending on the context of the system 100.

In one implementation, one or more of components of the system 100 may be implemented in a computing device such as a laptop computer, desktop computer, tablet, smartphone, or generally, any type of computing device having at least one processor and non-transitory computer readable medium that stores instructions executable by the at least one processor for performing the functionalities/operations of the system 100 as discussed herein. The image capturing device 105 may be a video camera included within the computing device itself, or connected to the computing device. Further, the computing device may include the face detecting and tracking unit 110, as well as the visual speech detector 125. Alternatively, the face detection and tracking unit 110 and/or the visual speech detector 125 may be implemented on an application server remote from the computing device. In this case, the face detection and tracking unit 110 may receive the video signal from the image capturing device 105 over a network from the computing device, and/or the visual speech detector 125 may receive the coordinate-based signal over a network from the computing device.

The image capturing device 105 may capture video images of a person 106 located within the range of the image capturing device 105, and provide a video signal including the video data to the face detection and tracking unit 110. The video data may include a plurality of video frames of the person 106. The face detection and tracking unit 110 may include a facial landmark detector 115, and a signal generator 120. The facial landmark detector 115 may be configured to receive the video signal captured by the image capturing device 105, and detect one or more facial landmarks on the video data of the captured video signal. The one or more facial landmarks may include any type of facial feature of the person 106 such as an eye region, mouth region, head region, etc.

The facial landmark detector 115 may determine the coordinates (e.g., locations and/or dimensions) of the facial landmarks from the video data. In further detail, the facial landmark detector 115 may determine the coordinates of the facial landmarks for each captured video frame, and provide the coordinates to the signal generator 120. The coordinates may represent points within the context of the video frame for the corresponding facial landmark(s). In one implementation, with respect to the mouth region, the mouth region's coordinates may include a mouth left point, a mouth right point, a mouth center point, and an upper and lower lip points, among others, for example. Accordingly, the facial landmark detector 115 may determine the coordinates of the mouth region, as well as any other detected facial landmark. Also, according to one implementation, the facial landmark detector 115 may compute a confidence level which represents the accuracy or reliability based on the number of extracted features. A face is assumed to be found if the confidence level is above a confidence level threshold. However, the facial landmark detector 115 may utilize any type of facial detection mechanisms known to one of ordinary skill in the art to obtain coordinates of the mouth region or any other facial landmark, as well as the computation of the confidence level.

The signal generator 120 may be configured to generate the coordinate-based signal based on the coordinates from the facial landmark detector 115. For example, the signal generator 120 may select the coordinates corresponding to the mouth region among the received coordinates, and generate the coordinate-based signal based on the mouth region's coordinates. As such, over time, the coordinate-based signal may represent the motion (or lack thereof) of the mouth region. In particular, the signal generator 120 may calculate a size of the mouth region for a plurality of video frames using the mouth region's coordination points such as the mouth left point, the mouth right point, the mouth center point, and the upper and lower lip points, and/or any other type of coordinate point used to identify a location of the mouth region.

Then, the signal generator 120 may generate the coordinate-based signal to include values that represent the motion of the mouth region, which may be the differences in the dimensions of the mouth region between subsequent video frames. In further detail, the signal generator 120 may calculate a ratio of the height of the mouth region and the width of the mouth region based on the mouth region's coordination points, and may generate the coordinate-based signal to include values indicating this ratio over a series of video frames. However, it is noted that the coordinate-based signal is not limited to values of width/height of the mouth region, where the coordinate-based signal may include any type of values representing the motion of the mouth region.

In a further implementation, the signal generator 120 may calculate values representing a ratio of the absolute value of the height of the mouth region and the absolute value of the width of the mouth region based on the mouth region's coordination points, e.g., |Height|/|Width|. However, the signal generator 120 may generate any type of values of the coordinate-based signal that represent the absolute motion of the mouth region. In other words, the absolute motion of the mouth region is not limited to the |Height|/|Width| ratios, where any function there-of may be implemented to represent the absolute motion of the mouth region. The signal generator 120 may generate the coordinate-based signal to include values indicating the |Height|/|Width| for the video frames.

The absolute values may be used to compensate (normalize) face movements. As such, over time, the coordinate-based signal may represent the movement (or lack of movement) of the tracked mouth region. For example, if the ratio remains substantially the same over a sequence of video frames, it can be initially assumed that the person 106 is not speaking in the video frames. However, if the ratio changes over the period of time, the person 106 may have been speaking in the video frames. The use of the absolute values of the height and width may account for any angles of the mouth region such as when the person 106 tilts his/her head, for example.

The visual speech detector 125 may receive the coordinate-based signal, and compute the probability of speech of the person 106 using the coordinate-based signal. For instance, this type of speech detection does not utilize any audio information from the person 106. However, as explained below, the visual speech detector 125 may be enhanced by an audio signal, but the presence of the audio signal is not required. Based on the received coordinate-based signal, the visual speech detector 125 can estimate whether or not speech has occurred by computing the probability of speech. As further explained below, the visual speech detector 125 may detect speech in a manner that can be applied to a plurality of speakers, but also takes into account the individual characteristics of the speaker. In this manner, regardless of how a person 106 actually speaks (e.g., some people have greater mouth activity when speaking), the video-based speech detection mechanism employed by the visual speech detector 125 may be applied to a plurality of different individuals, while at the same time, may detect speech using the individual characteristics of the person 106 using the person's active range.

The visual speech detector 125 may include a histogram builder 130 for constructing of a histogram 140 of the coordinate-based signal, a quantizer 135 for quantizing (partitioning) the coordinate-based signal, a database 136 for storing the histogram 140, a data validator 145 for validating the coordinate-based signal, a database 150 for storing the validated partitioned signal, a filtered value calculator 155 for calculating a long-term value and a short-term value of the validated partitioned signal, a long-term bin selector 160, a short-term bin selector 165, a bin comparator 170, and a probability calculator 180 for computing the probability of speech of the person 106. Also, the visual speech detector 125 may include other components that are well known to one of ordinary skill in the art.

The quantizer 135 may be configured to receive the coordinate-based signal from the signal generator 120, and partition the coordinate-based signal into a plurality of bins. For example, the quantizer 135 may partition (quantize) the coordinate-based signal into the plurality of bins. In more detail, the amplitude of the coordinate-based signal may take on values over an interval of time such as two or more video frames. The quantizer 135 may partition or divide coordinate-based signal into a plurality of levels, where the space between each level may be referred to as a bin. As such, the quantizer 135 may partition the coordinate-based signal over the interval into the plurality of bins. The values that lie in a given bin are rounded to a reconstruction value associated with that bin. In one implementation, the quantizer 135 may select the reconstruction values to be the value of the center of each bin. Once the bins and the reconstruction values have been determined, the quantizer 135 may quantize each sample of the coordinate-based signal by determining the bin into which it falls, and then changing the sampled value to the associated reconstruction value. However, the quantizer 135 may partition the coordinate-based signal into the plurality of bins according to any type of quantizer schemes known to one of ordinary skill in the art. Within the context of speech detection, the bins represent a state of the mouth region (open/closed) over time.

The histogram builder 130 may be configured to also receive the coordinate-based signal from the signal generator 120, and construct the histogram 140 of the coordinate-based signal. For example, while as the same time of partitioning the coordinate-based signal (or at a subsequent time), the histogram builder 130 may be configured to construct the histogram 140 of the un-partitioned (actual) coordinate-based signal. The histogram 140 may be a representation showing an impression of the distribution of data of the coordinate-based signal. The histogram builder 130 may construct the histogram 140 according to any type of histogram construction technique known to one of ordinary skill in the art. The histogram 140 may provide a resolution higher than the quantized signal. The histogram builder 130 may store the constructed histogram 140 in the database 136. Among other uses, the histogram 140 may be used to check the validity of the coordinate-based signal, as discussed below.

In one implementation, the data validator 145 may determine a validity of the coordinate-based signal based on the histogram 140 and/or the confidence level indicating a detection accuracy for the mouth region. However, generally, the data validator 145 may determine if the coordinate-based signal is valid for further processing. If the data validator 145 determines that the coordinate-based signal is valid, the data validator 145 may transfer the partitioned signal from the quantizer 135 to the database 150. According to one aspect, the data validator 145 may determine an active range 142 of the person 106 based on the histogram 140. For example, the data validator 145 may define the active range 142 from the values of the histogram 140. The data validator 145 may analyze the range and distribution of the histogram values. In particular, the data validator 145 may compute the active range 142 as the X % of the histogram values, where the parameter X may be any type of value. Then, the data validator 145 may determine if the active range 142 is above a threshold active range value. In particular, if the active range 142 is below the threshold active range value (e.g., sufficiently low), the coordinate-based signal may be determined as representing silence (e.g., insufficient mouth activity). In this case, the data validator 145 may update the active range 142 based on the coordinate-based signal for subsequent video frames until the active range 142 is above the active range threshold value. Then, the data validator 145 may output the partitioned signal to the database 150.

According to another aspect, the data validator 145 may receive the confidence level from the face detection and tracking unit 110. As indicated, the confidence level may indicate a level of detection accuracy for the mouth region. The data validator 145 may compare the confidence level to a confidence level threshold, and if the confidence level is above the confidence level threshold, the data validator 145 may validate the coordinate-based signal. Then, the data validator 145 may transfer the partitioned signal to the database 150 for further processing. However, if the confidence level is below the confidence level threshold, the data validator 145 may determine that the coordinate-based signal is not valid, and wait for further samples such that the confidence level can be determined as exceeding the confidence level threshold.

The partitioned signal in the database 150 may be considered validated with respect to the active range 142, the confidence level, and/or any other types of similar validation techniques. Then, the filtered value calculator 155 may be configured to calculate short-term statistics and long-term statistics of the partitioned, validated coordinate-based signal. For instance, the filtered value calculator 155 may use any type of statistical analysis in order to obtain short-term and long-term statistics of the coordinate-based signal. The terms long-term and short-term may correspond to the degree of history length of the coordinated-based signal. In other words, the filtered value calculator 155 may calculate the long-term and short-term characteristics of the coordinate-based signal in order to compare the momentarily (recent) behavior to the steady state behavior, thereby obtaining what represents an open/closed mouth for the person 106, and what are the variations/fluctuations of the signal in order to determine whether the person 106 is actually speaking. As such, generally, the filtered value calculator 155 may calculate a long-term value representing the long-term characteristics of the coordinate-based signal, and a short-term value representing the short-term characteristics of the coordinate-based signal.

In one implementation, the long-term bin may represent closed mouth values. These may be calculated over time given the statistics of the signal on all frames or on selected frames. The short-term statistics will then be compared to this value.

In one implementation, the filtered value calculator 155 may be configured to calculate a short-term moving average and a long-term moving average of the partitioned, validated coordinate-based signal. However, as indicated above, other types of filters may be applied to the coordinate-based signal to obtain the long-term value and the short-term value. With respect to the moving averages implementation, the filtered value calculator 155 may calculate the short-term moving average and the long-term moving average by analyzing the motion information of the coordinate-based signal over an interval to obtain an average or mean, which, in one example, may be weighted short-term and long-term moving averages. Also, it is noted that using such filters to obtain the short-term and long-term values do not require additional memory, as they are applied in each new value as the coordinate-based signal is being processed. The filtered value calculator 155 may use any type of known moving average calculation techniques to obtain the short-term moving average and the long-term moving average of the coordinate-based signal. As such, the short-term moving average of the signal may account for short-term trends, while the long-term moving average of the signal may account for long-term trends. Also, the short-term moving average is taken into account for noisy measurements, and for the natural fluctuations of the coordinate-based signal during speech (e.g., open/closed mouth).

The long-term bin selector 160 may select a long-term bin (e.g., also referred to as a first bin) from the plurality of bins associated with the partitioned signal that corresponds to the long-term value (e.g., the long-term moving average, or other long-term value representing the long-term characteristics of the signal). For example, the long-term bin selector 160 may receive the long-term value (LT Value) from the filtered value calculator 155, and select one of the plurality of bins of the partitioned coordinate-based signal as the long-term bin based on the partitioned signal and the long-term value. In more detail, the long-term bin selector 160 may locate the long-term bin by determining which of the plurality of bins the long-term value belong to. As such, the long-term bin selector 160 may select one of the plurality of bins as the long-term bin, where the long-term bin represents the bin encompassing the long-term value.

In one implementation, the bins above the long-term bin may represent open mouth regions (speech), and the bins below the long-term bin may represent closed mouth regions (non-speech). Further, the long-term bin may represent possible speech. For example, the long-term bin selector 160 may set the bins above the long-term bin as indicating speech, set bins below the long-term bin as indicating non-speech, and the long-term bin as indicating possible speech. The bins represent a state of the mouth region (open/closed) over time. The underlying assumption is that in the presence of speech the actual signal will fluctuate between open and closed, which will be represented in the bin's representative value. Further, in one implementation, if the long-term value is sufficiently close to a bin threshold, the long-term bin selector 160 may merge the two bins adjacent to the bin threshold, and define the speech bins and the non-speech bins in the same manner described above. Then, the combined bin may be considered the long-term bin.

A short-term bin selector 165 may be configured to select a short-term bin (also referred to as a second bin) from the plurality of bins that correspond to the short-term value. For example, the short-term bin selector 165 may receive the short-term value (ST Value) from the filtered value calculator 155, and select one of the plurality of bins of the partitioned coordinate-based signal as the short-term bin based on the partitioned signal and the short-term value. In more detail, the short-term bin selector 165 may locate the short-term bin by determining which of the plurality of bins the short-term value belongs to. As such, the short-term bin selector 165 may select one of the plurality of bins as the short-term bin, where the short-term bin represents the bin encompassing the short-term value.

The bin comparator 170 may be configured to compare the long-term bin with the short-term bin, and the probability calculator 180 may be configured to calculate the probability of speech based on the comparison. For example, the bin comparator 170 may determine if the short-term bin is less, greater, or equal to the long-term bin, and depending on the comparison, the probability calculator 180 may compute the probability of speech of the person 106, e.g., how likely the person 106 was speaking. Then, the probability calculator 180 may output the computed probability of speech. The probability of speech may be a first value indicating that speech has occurred (e.g., a probability of 1), a second value indicating that speech has not occurred (e.g., a probability of 0), or an intermediate value between the first and second values (e.g., a probability between 0 and 1), as further discussed with reference to FIG. 2. Also, invalid data can be signaled within the probability of speech as −1, or 0.5 to signal neutrality.

Figure 2:
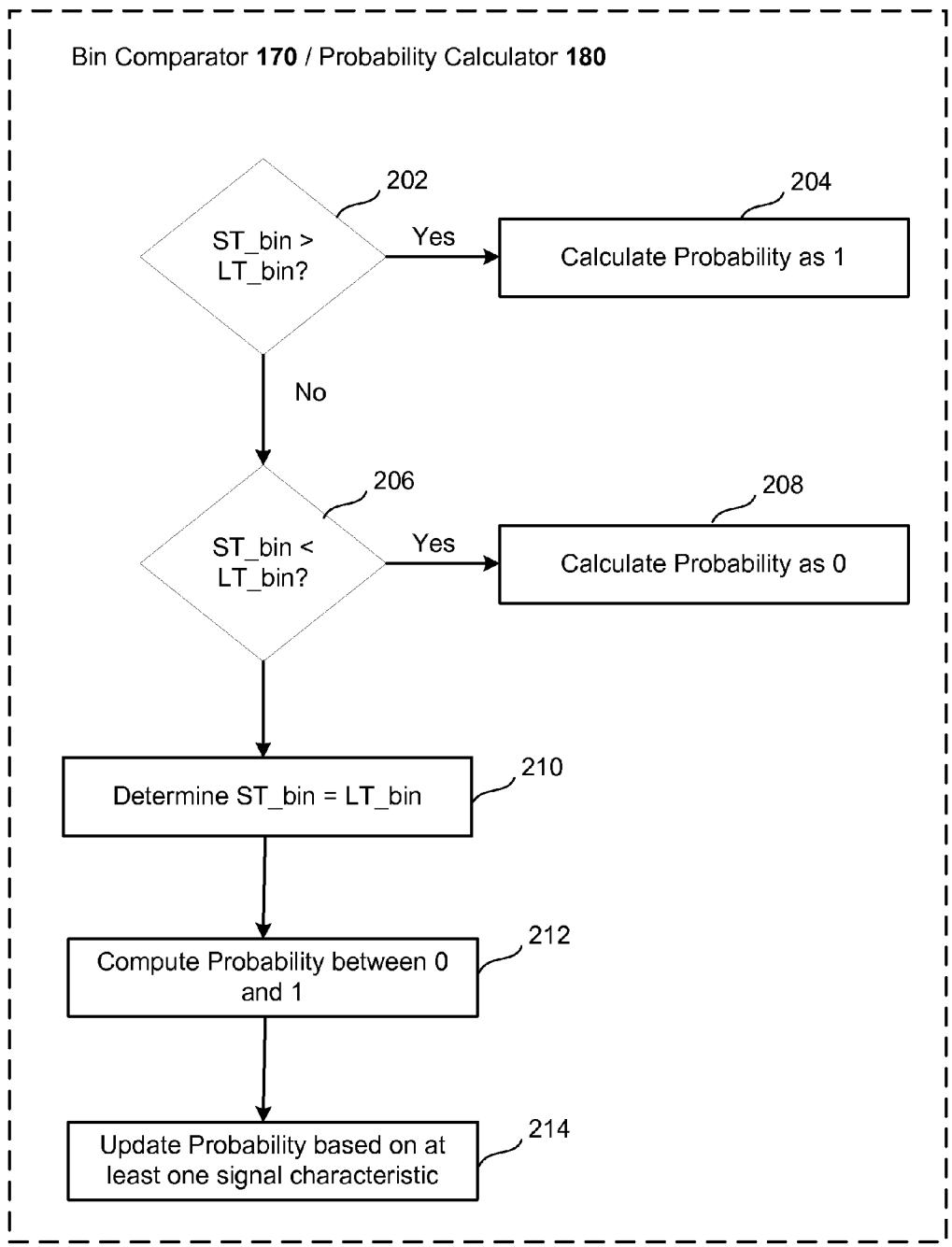
FIG. 2 illustrates a flowchart depicting example operations of a bin comparator and a probability calculator of FIG. 1.

FIG. 2 illustrates a flowchart depicting example operations of the bin comparator 170 and the probability calculator 180 of FIG. 1. Although the flowchart of FIG. 2 illustrates the example operations in sequential order, it will be appreciated that this is merely an example, and that additional or alternative operations may be included. Further, the example operations of FIG. 2 and related operations may be executed in a different order than that shown, or in a parallel or overlapping fashion.

For example, in 202, the bin comparator 170 may determine whether the short-term bin is greater than the long-term bin. If the short-term bin is determined as greater than the long-term bin, in 204, the probability calculator 180 may compute the probability of speech as the first value indicating that speech has occurred. In one implementation, the probability calculator 180 may compute the probability of speech as 1. However, if the bin comparator 170 determines that the short-term bin is not greater than the long-term bin, the process proceeds to 206, and the bin comparator 170 determines if the short-term bin is less than the long-term bin. If the short-term bin is determined as less than the long-term bin, the probability calculator 180 may compute the probability of speech as the second value indicating that speech has not occurred. In one implementation, the probability calculator 180 may compute the probability of speech as 0.

However, if the short-term bin is not greater or less than the long-term bin, in 210, the bin comparator 170 may determine the short-term bin is equal to the long-term bin. Then, in 212, the probability calculator 180 may calculate the probability of speech as an intermediate value between the first value and the second value (e.g., a value between 0 and 1). In one implementation, the probability calculator 180 may calculate a ratio of the distance of the short-term value from the partition border, and the partition size. Then, depending on the ratio, the probability calculator 180 may compute the probability of speech of the person 106.

In more detail, the probability calculator 180 may compute the distance of the short-term value from a border of the bin encompassing the short-term value and the long-term value. For example, since the short-term bin and the long-term bin are equal to each other (from 210), the border of the bin is either the upper or lower level of the short-term/long-term bin. As such, the probability calculator 180 may compute the distance from either the upper or lower level of the bin to the actual short-term value. Then, the probability calculator 180 may calculate a size of the short-term/long-term bin, e.g., the distance between the upper level of the short-term/long-term bin, and the lower level of the short-term/long-term bin. Next, the probability calculator 180 may compute the ratio of 1) the distance between the short-term value and the bin partition, and 2) the size of the bin. Depending on the value of the ratio, the probability calculator 180 may compute the intermediate value representing the probability of speech. For instance, in one implementation, the values (or ranges of values) of the ratio may be assigned to different probabilities. Therefore, depending on which value (or range of values) the computed ratio corresponds to (or falls into to), the probability calculator 180 selects the appropriate probability of speech such as any value indicating a probability between [0, 1].

According to another implementation, the probability calculator 180 may compute the intermediate value based on Bayesian inference, which accounts for a mean and variance based on the signal values belonging to the lower and upper bins. For example, referring back to FIG. 1, the probability calculator 180 may also receive the actual coordinate-based signal. In this implementation, the probability calculator 180 may determine two Gaussian distributions, where one reflects a closed mouth region and another reflects an open mouth region. Using the actual coordinate-based signal (e.g., un-partitioned signal), the probability calculator 180 may calculate the probability that the signal belong to one or the other Gaussian distribution. This probability may then be outputted as the intermediate value representing the probability of speech.

In a further implementation, in 214, the probability calculator 180 may receive the actual coordinate-based signal (e.g., un-partitioned signal), and update the probability of speech based on at least one signal characteristic of the coordinate-based signal. For example, the probability calculator 180 may update the intermediate value using one or more signal characteristics such as the actual signal value, the active range 142, and/or the signal variance. In particular, the probability of speech computations, discussed above, is based on the quantized (partitioned) signal of the coordinate-based signal. However, in the event that the probability calculator 180 has determined that the probability of speech falls into the intermediate value (e.g., between 0 and 1), the probability calculator 180 may adjust the computed probability of speech using one or more characteristics of the actual signal, e.g., the un-partitioned coordinate-based signal. Also, it is noted that the intermediate value may be updated based on the variance of the partitioned, filtered coordinate-based signal. These additional statistics may determine if a value will be incorporated in the long-term value calculation.

In one example, the probability calculator 180 may obtain the value(s) of the actual coordinate-based signal for at least one relatively recent video frame from the histogram 140, and then adjust the probability of speech based on the obtained value(s). For instance, if the ratio |H|/|W| for one or more recent video frames of the coordinate-based signal indicate mouth activity (e.g., above a certain value), the probability calculator 180 may increase the intermediate value to a higher value. On the other hand, if the ratio |H|/|W| for one or more recent video frames of the coordinate-based signal indicate silence (e.g., below a certain value), the probability calculator 180 may decrease the intermediate value to a lower value.

Also, the probability calculator 180 may obtain the active range 142 from the database 136 and/or the data validator 145, and adjust the probability of speech based on the active range 142. For example, if the active range 142 is sufficiently high, the probability calculator 180 may increase the intermediate value to a higher value. If the active range 142 is sufficiently low, the probability calculator 180 may decrease the intermediate value to a lower value. In addition, the probability calculator 180 may compute or receive the signal variance from the database 136 and/or the data validator 145, and depending on the value of the signal variance, the probability calculator 180 may adjust the intermediate value to one of a higher value or a lower value. As such, the probability calculator 180 may update the probability of speech based on at least one signal characteristic including the actual signal value, the active range 142, the signal variance, or any other type of signal characteristic of the non-partitioned coordinate-based signal.

In addition, the probability calculator 180 may adjust the probability of speech based on an analysis of multiple signal characteristics of the coordinate-based signal. For example, when multiple parameters are used, the probability adjustment may be calculated within a multi-dimensional classification problem. The probability calculator 180 may simultaneously analyze multiple parameters of the coordinate-based signal (e.g. the signal values, the active range, the signal variance, etc.), and then adjust the probability of speech based on an outcome of the analysis. This simultaneous analysis may be performed according to any type of multi-dimensional classification analysis, for example.

Referring back to FIG. 1, the visual speech detector 125 may include other enhanced features relating to video-based speech detection. In one example, the probability calculator 180 may consider the time frame of the video signal, and may adjust the probability of speech based on the time of the video signal. In particular, the probability calculator 180 may adjust the probability of speech to a lower probability if the coordinate-based signal represents early measurements. For instance, if the coordinate-based signal represents one or more video frames at (or around the start) of video signal, the probability calculator 180 may decrease the intermediate value to a lower probability. Alternatively, the visual speech detector 125 may simply disregard a portion of the coordinate-based signal representing the video frames at (or around the start) of the video signal, and then analyze the coordinate-based signal representing the video frames after a threshold period of time from the start of the video stream. Also, in another implementation, the probability calculator 180 may direct the filtered value calculator 155 to modify a weight factor for the long-term value in order to increase its convergence. In another implementation, the data validator 145 may allow for an adaption time following a detection mismatch as indicated by the confidence value being below the confidence level threshold.

Still further, in another implementation, the face detection and tracking unit 110 may additionally perform a luminance-based detection. The luminance-based detection may detect mouth region activity based on the luminance values of the video signal. In particular, the face detection and tracking unit 110 may compute luminance-based values over a region-of-interest (ROI) around the mouth region. In this implementation, the probability calculator 180 may receive the luminance-based values, and adjust the intermediate value to one of a higher value or lower value depending on the luminance-based values. For instance, a relatively low variation of the luminance-based value may indicate that speech is less likely to have occurred, and therefore, the probability calculator 180 may adjust the probability of speech accordingly.

Still further, the probability calculator 180 may receive audio data corresponding to the received video data. For example, some movements do not correspond to actual speech. As such, the audio signal cannot differentiate between different speech types, but can provide useful information that identifies complete silence (no speech). As such, the probability calculator 180 may be configured to adjust the intermediate value to one of a higher probability or lower probability, depending on the received audio data.

Figure 3:
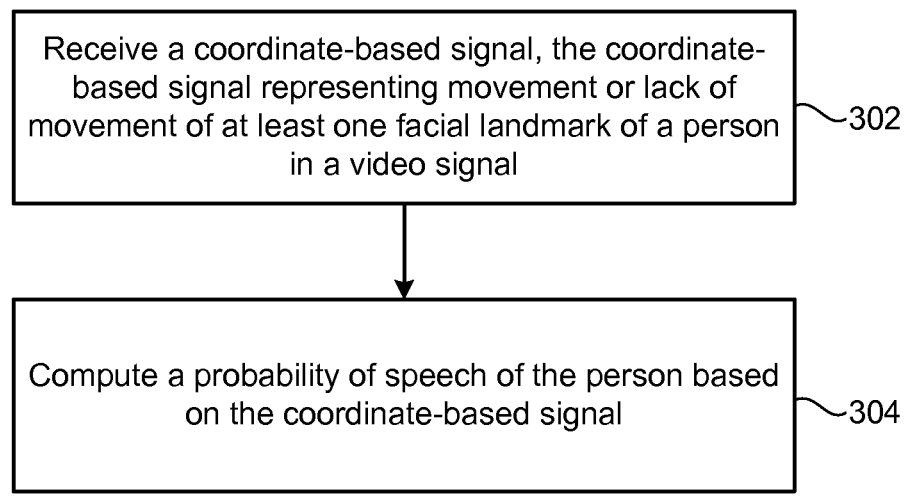
FIG. 3 is a flowchart illustrating example operations of the system of FIG. 1.

FIG. 3 is a flowchart illustrating example operations of the system 100 of FIG. 1. Although the flowchart of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

A coordinate-based signal may be received, where the coordinate-based signal represents movement or lack of movement of at least one facial landmark of a person in a video signal (302). For example, the visual speech detector 125 may receive the coordinate-based signal from the face detecting and tracking unit 110. The coordinate-based signal may represent movement or lack of movement of one or more facial landmarks on the person 106 in proximity to the image capturing device 105. In one implementation, the at least one facial landmark may include a mouth region of the person 106. As such, the coordinate-based signal may represent the coordinates of the mouth region over a period of time such as the mouth left point, the mouth right point, the mouth center point, and the upper and lower lip points, and/or any other type of coordinate point used to identify a location of the mouth region. Also, the coordinate-based signal may represent a size of the mouth region for each video frame. In further detail, the coordinate-based signal may include values indicating a ratio of the height and width of the mouth region for a plurality of video frames. Also, according to another implementation, the coordinate-based signal may include values indicating a ratio of the absolute value of the height of the mouth region and the absolute value of the width of the mouth region, e.g., |Height|/|Width|. As such, the coordinate-based signal may include values indicating the |Height|/|Width| of the mouth region for a plurality of video frames.

A probability of speech of the person may be computed based on the coordinate-based signal (304). For example, the visual speech detector 125 may compute the probability of speech of the person 106 using the coordinate-based signal. For instance, this type of speech detection may not use any audio information from the person 106. Rather, based on the received coordinate-based signal, the visual speech detector 125 can estimate whether or not speech has occurred by computing the probability of speech. However, this video-based detection mechanism may be enhanced by audio information, as further explained above.

Figure 4:
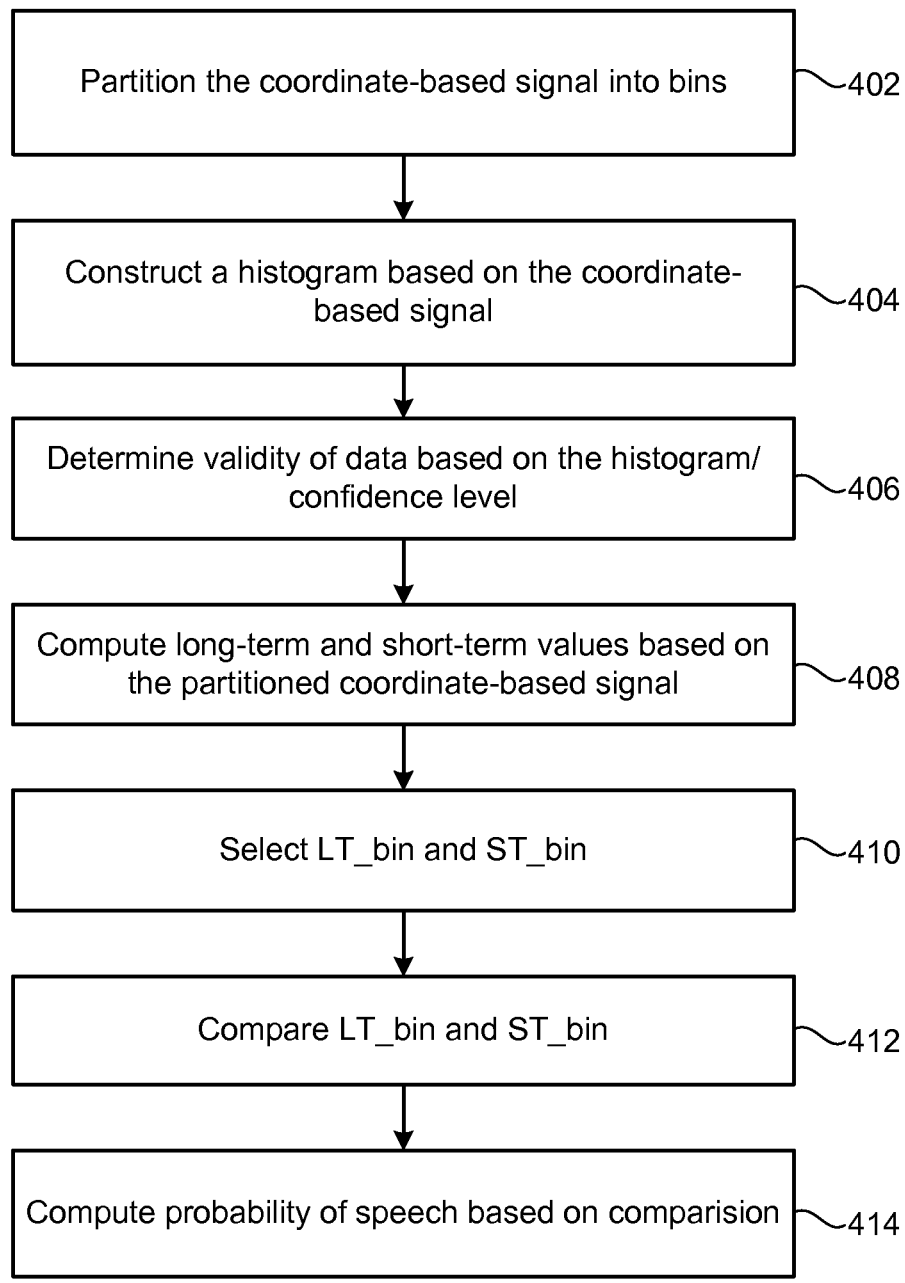
FIG. 4 is a flowchart illustrating example operations of the system of FIG. 1.

FIG. 4 is a flowchart illustrating example operations of the system 100 of FIG. 1. Although the flowchart of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

The coordinate-based signal may be partitioned into bins (402). For example, the quantizer 135 may be configured to receive the coordinate-based signal from the signal generator 120, and partition the coordinate-based signal into a plurality of bins. The quantizer 135 may partition or divide coordinate-based signal into a plurality of levels, where the space between each level may be referred to as a bin. As such, the quantizer 135 may partition the coordinate-based signal over the interval into the plurality of bins. The values that lie in a given bin are rounded to a reconstruction value associated with that bin. In one implementation, the quantizer 135 may select the reconstruction values to be the value of the center of each bin. Once the bins and the reconstruction values have been determined, the quantizer 135 may quantize each sample of the coordinate-based signal by determining the bin into which it falls, and then changing the sampled value to the associated reconstruction value.

A histogram may be constructed based on the coordinate-based signal (404). For example, the histogram builder 130 may be configured to also receive the coordinate-based signal from the signal generator 120, and construct the histogram 140 of the coordinate-based signal. For example, while at the same time of partitioning the coordinate-based signal (or at a subsequent time), the histogram builder 130 may be configured to construct the histogram 140 of the un-partitioned (actual) coordinate-based signal. The histogram 140 may be a representation showing an impression of the distribution of data of the coordinate-based signal.

A validity of data may be determined based on the histogram and/or the confidence level (406). For example, the data validator 145 may determine a validity of the coordinate-based signal based on the histogram 140. According to one aspect, the data validator 145 may determine the active range 142 of the person 106 based on the histogram 140. For example, the data validator 145 may define the active range 142 from the values of the histogram 140. Then, the data validator 145 may determine if the active range 142 is above a threshold active range value. If the active range 142 is below the threshold active range value (e.g., sufficiently low), the coordinate-based signal may be determined as representing silence (e.g., insufficient mouth activity). In this case, the data validator 145 may update the active range 142 based on the coordinate-based signal for subsequent video frames until the active range 142 is above the active range threshold value. Then, the data validator 145 may output the partitioned signal to the database 150.

According to another aspect, the data validator 145 may receive the confidence level from the face detection and tracking unit 110. The confidence level may indicate a level of detection accuracy for the mouth region. The data validator 145 may compare the confidence level to a confidence level threshold, and if the confidence level is above the confidence level threshold, the data validator 145 may validate the coordinate-based signal. Then, the data validator 145 may transfer the partitioned signal to the database 150 for further processing. However, if the confidence level is below the confidence level threshold, the data validator 145 may determine that the coordinate-based signal is not validated, and wait for further samples such that the confidence level can be determined as exceeding the confidence level threshold.

A long-term value and a short-term value may be computed based on the partitioned coordinate-based signal (408). For example, the filtered value calculator 155 may be configured to calculate short-term statistics and long-term statistics of the partitioned, validated coordinate-based signal. For instance, the filtered value calculator 155 may use any type of statistical analysis in order to obtain short-term and long-term statistics of the coordinate-based signal. The filtered value calculator 155 may calculate the long-term and short-term characteristics of the coordinate-based signal in order to compare the momentarily (recent) behavior to the steady state behavior, thereby obtaining what represents an open/closed mouth for the person 106, and what are the variations/fluctuations of the signal in order to determine whether the person 106 is actually speaking. As such, generally, the filtered value calculator 155 may calculate a long-term value representing the long-term characteristics of the coordinate-based signal, and a short-term value representing the short-term characteristics of the coordinate-based signal.

In one implementation, the filtered value calculator 155 may be configured to calculate a short-term moving average and a long-term moving average of the partitioned, validated coordinate-based signal. However, as indicated above, other types of filters may be applied to the coordinate-based signal to obtain the long-term value and the short-term value. With respect to the moving averages implementation, the filtered value calculator 155 may calculate the short-term moving average and the long-term moving average by analyzing the motion information of the coordinate-based signal over an interval to obtain an average or mean, which, in one example, may be weighted short-term and long-term moving averages.

A long-term bin (LT_bin) and a short-term bin (ST_bin) may be selected (410). For example, the long-term bin selector 160 may select a long-term bin from the plurality of bins associated with the partitioned signal that corresponds to the long-term value. The long-term bin selector 160 may locate the long-term bin by determining which of the plurality of bins the long-term value belong too. As such, the long-term bin selector 160 may select one of the plurality of bins as the long-term bin, where the long-term bin represents the bin encompassing the long-term value.

The bins above the long-term bin may represent open mouth regions (speech), and the bins below the long-term bin may represent closed mouth regions (non-speech). Further, the long-term bin may represent possible speech. For example, the long-term bin selector 160 may set the bins above the long-term bin as indicating speech, set bins below the long-term bin as indicating non-speech, and the long-term bin as indicating possible speech. The bins represent a state of the mouth region (open/closed) over time. The underlying assumption is that in the presence of speech the actual signal will fluctuate between open and closed, which will be represented in the bin's representative value. Further, in one implementation, if the long-term value is sufficiently close to a bin threshold, the long-term bin selector 160 may merge the two bins adjacent to the bin threshold, and define the speech bins and the non-speech bins in the same manner described above. Then, the combined bin may be considered the long-term bin.

The short-term bin selector 165 may be configured to select a short-term bin from the plurality of bins that correspond to the short-term value. For example, the short-term bin selector 165 may locate the short-term bin by determining which of the plurality of bins the short-term value belongs too. As such, the short-term bin selector 165 may select one of the plurality of bins as the short-term bin, where the short-term bin represents the bin encompassing the short-term value.

The long-term bin may be compared with the short-term bin (412), and a probability of speech may be computed based on the comparison (414). For example, the bin comparator 170 may compare the long-term bin with the short-term bin, and the probability calculator 180 may be configured to calculate the probability of speech based on the comparison. For example, the bin comparator 170 may determine if the short-term bin is less, greater, or equal to the long-term bin, and depending on the comparison, the probability calculator 180 may compute the probability of speech of the person 106, e.g., how likely the person 106 was speaking. Then, the probability calculator 180 may output the computed probability of speech. The probability of speech may be a first value indicating that speech has occurred (e.g., a probability of 1), a second value indicating that speech has not occurred (e.g., a probability of 0), or an intermediate value between the first and second values.

Figure 5:
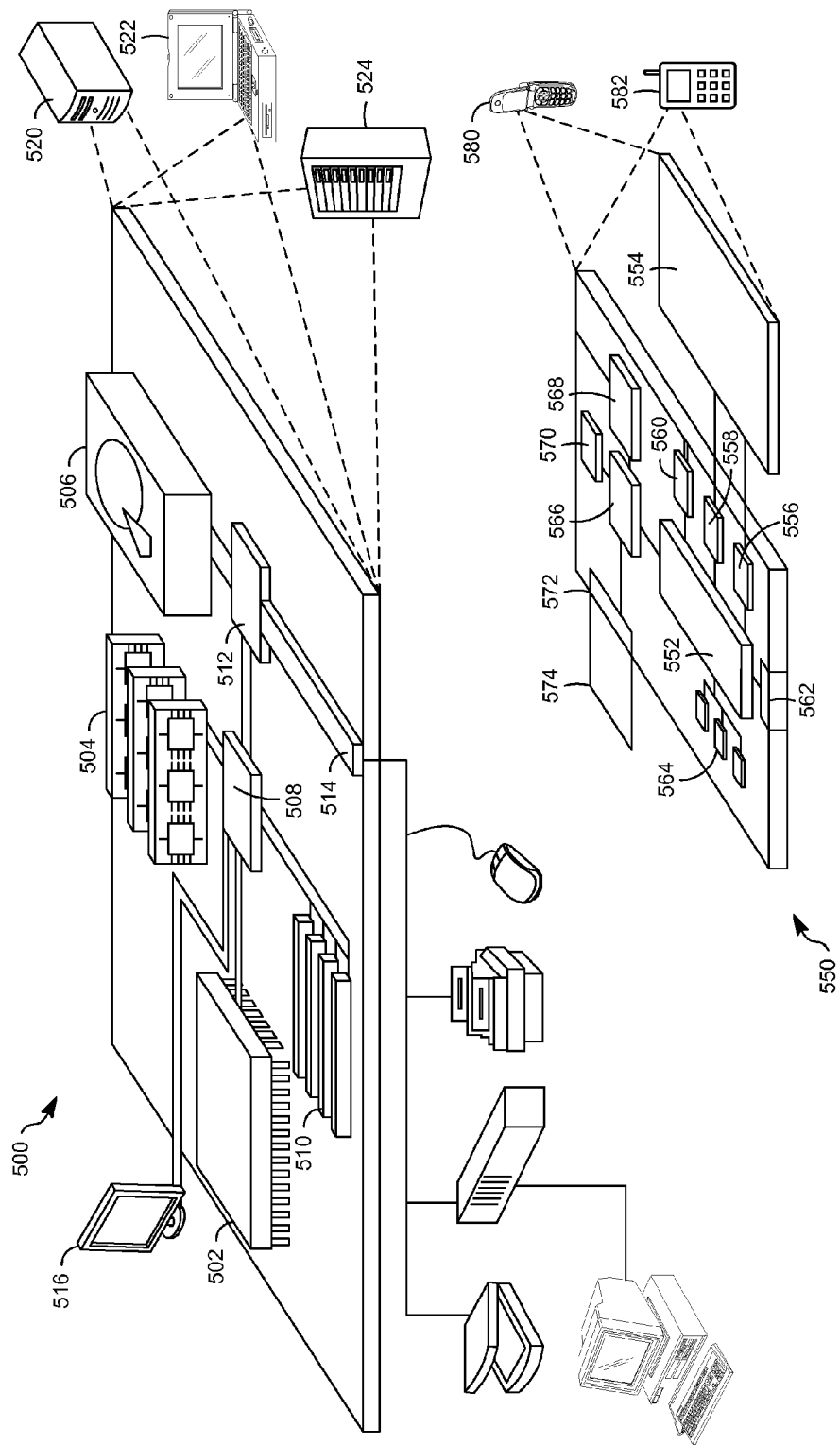
FIG. 5 is a block diagram showing example or representative computing devices and associated elements that may be used to implement the system of FIG. 1.

FIG. 5 is a block diagram showing example or representative computing devices and associated elements that may be used to implement the system of FIG. 1. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various buses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "receiving", or "processing" or "computing" or "calculating" or "determining" or "displaying" or "providing", or "partitioning", or "constructing", or "selecting", or "comparing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A data processing apparatus for detecting a probability of speech based on video data, the data processing apparatus comprising:
   at least one processor;
   a non-transitory computer-readable storage medium including instructions executable by the at least one processor, wherein execution of the instructions by the at least one processor causes the data processing apparatus to execute:
   a visual speech detector configured to receive a coordinate-based signal, the coordinate-based signal representing movement or lack of movement of at least one facial landmark of a person in a video signal;
   the visual speech detector configured to calculate a short-term value representing short-term characteristics of the coordinated-based signal and a long-term value representing long-term characteristics of the coordinate-based signal,
   the visual speech detector configured to compute a probability of speech of the person based on a comparison of the short-term value and the long-term value, wherein, when the short-term value is greater than the long-term value, the visual speech detector computes the probability of speech as a value indicating that speech as occurred.

2. The data processing apparatus of claim 1, wherein execution of the instructions by the at least one processor further causes the data processing apparatus to execute:
   a facial landmark detector configured to receive the video signal including video data captured from an image capturing device, and determine coordinates of the at least one facial landmark based on the video data; and
   a signal generator configured to generate the coordinate-based signal based on the coordinates of the at least one facial landmark.

3. The data processing apparatus of claim 1, wherein the at least one facial landmark includes a mouth region of the person.

4. The data processing apparatus of claim 3, wherein the coordinate-based signal includes values indicating a ratio of height and width of the mouth region for a plurality of video frames.

5. The data processing apparatus of claim 1, wherein the visual speech detector includes:
   a quantizer configured to partition the coordinate-based signal into a plurality of bins;
   a filtered value calculator configured to calculate the short-term value and the long-term value;
   a long-term bin selector configured to select a long-term bin from the plurality of bins that corresponds to the long-term value;
   a short-term bin selector configured to select a short-term bin from the plurality of bins that corresponds to the short-term value;
   a bin comparator configured to compare the long-term bin with the short-term bin; and
   a probability calculator configured to calculate the probability of speech based on the comparison.

6. The data processing apparatus of claim 5, wherein the bin comparator configured to compare the long-term bin with the short-term bin includes determining that the short-term bin is greater than the long-term bin, wherein the probability calculator calculates the probability of speech as a value indicating that speech has occurred.

7. The data processing apparatus of claim 5, wherein the bin comparator configured to compare the long-term bin with the short-term bin includes determining that the short-term bin is less than the long-term bin, wherein the probability calculator calculates the probability of speech as a value indicating that speech as not occurred.

8. The data processing apparatus of claim 5, wherein the bin comparator configured to compare the long-term bin with the short-term bin includes determining that the short-term bin is equal to the long-term bin, wherein the probability calculator calculates the probability of speech as an intermediate value between a first value indicating that speech has occurred and a second value indicating that speech has not occurred.

9. The data processing apparatus of claim 8, wherein the probability calculator is configured to adjust the intermediate value based on at least one signal characteristic of the coordinate-based signal.

10. The data processing apparatus of claim 5 wherein execution of the instructions by the at least one processor further causes the data processing apparatus to execute:
    a histogram builder configured to build a histogram of the coordinate-based signal;
    a data validator configured to determine an active range of the person based on the histogram, and determine a validity of the coordinate-based signal based on the active range.

11. A method for detecting a probability of speech based on video data,
    the method comprising:
    receiving, by at least one processor, a coordinate-based signal, the coordinate-based signal representing movement or lack of movement of at least one facial landmark of a person in a video signal;
    building, by the at least one processor, a histogram of the coordinate-based signal;
    determining, by the at least one processor, an active range of the person based on the histogram;
    validating, by the at least one processor, the coordinate-based signal based on the active range;
    calculating, by the at least one processor, a short-term value representing short-term characteristics of the validated coordinated-based signal and a long-term value representing long-term characteristics of the validated coordinate-based signal; and
    computing, by the at least one processor, a probability of speech of the person based on a comparison of the short-term value and the long-term value of the validated coordinate-based signal.

12. The method of claim 11, wherein the at least one facial landmark includes a mouth region.

13. The method of claim 12, wherein the coordinate-based signal includes values indicating a ratio of height and width of the mouth region for a plurality of video frames.

14. The method of claim 11, further comprising:
    partitioning, by the at least one processor, the validated coordinate-based signal into a plurality of bins;
    selecting, by the at least one processor, a long-term bin from the plurality of bins that corresponds to the long-term value and a short-term bin from the plurality of bins that corresponds to the short-term value;

comparing, by the at least one processor, the long-term bin with the short-term bin; and calculating, by the at least one processor, the probability of speech based on the comparison.

15. A non-transitory computer-readable medium storing instructions that when executed cause at least one processor to detect a probability of speech based on video data, the instructions comprising instructions to:

receive a coordinate-based signal, the coordinate-based signal representing movement or lack of movement of at least one facial landmark of a person in a video signal;

partition the coordinate-based signal into a plurality of bins;

calculate a short-term value representing short-term characteristics of the partitioned coordinated-based signal and a long-term value representing long-term characteristics of the partitioned coordinate-based signal;

select a long-term bin from the plurality of bins that corresponds to the long-term value and a short-term bin from the plurality of bins that corresponds to the short-term value;

compare the long-term bin with the short-term bin; and calculate a probability of speech of the person based on the comparison.

16. The non-transitory computer-readable medium of claim 15, wherein the at least one facial landmark includes a mouth region, and the coordinate-based signal includes values indicating a ratio of height and width of the mouth region for a plurality of video frames.

17. The non-transitory computer-readable medium of claim 15, wherein the instructions to compare the long-term bin with the short-term bin includes determining that the short-term bin is greater than the long-term bin, and the instructions to calculate a probability of speech includes calculating the probability of speech as a value indicating that speech has occurred.

18. The non-transitory computer-readable medium of claim 15, wherein the instructions to compare the long-term bin with the short-term bin includes determining that the short-term bin is less than the long-term bin, and the instructions to calculate a probability of speech includes calculating the probability of speech as a value indicating that speech has not occurred.

19. The non-transitory computer-readable medium of claim 15, wherein the instructions to compare the long-term bin with the short-term bin includes determining that the short-term bin is equal to the long-term bin, and the instructions to calculate a probability of speech includes calculating the probability of speech as an intermediate value between a first value indicating that speech has occurred and a second value indicating that speech has not occurred.

20. The non-transitory computer-readable medium of claim 19, wherein the instructions to calculate a probability of speech includes adjusting the intermediate value based on a simultaneous analysis of multiple signal characteristics of the coordinate-based signal.

* * * * *